United States Patent
Magee et al.

(10) Patent No.: US 6,563,885 B1
(45) Date of Patent: May 13, 2003

(54) DECIMATED NOISE ESTIMATION AND/OR BEAMFORMING FOR WIRELESS COMMUNICATIONS

(75) Inventors: David Patrick Magee, Plano, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/999,721

(22) Filed: Oct. 24, 2001

(51) Int. Cl.[7] ............................................. H04L 27/14
(52) U.S. Cl. ..................... 375/316; 375/278; 375/284; 375/285; 375/346; 455/296
(58) Field of Search ............................... 375/144, 147, 375/148, 260, 278, 284, 285, 254, 316, 346, 348, 349, 350; 370/317, 320, 332, 334, 342, 441, 465, 525, 526, 529; 455/67.3, 135, 222, 561, 456, 65, 277.1, 277.2, 296

(56) References Cited

U.S. PATENT DOCUMENTS

| | | | | |
|---|---|---|---|---|
| 4,177,430 A | * | 12/1979 | Paul | 327/100 |
| 4,849,764 A | * | 7/1989 | van Heyningen | 342/381 |
| 5,428,832 A | * | 6/1995 | Nohara et al. | 375/346 |
| 5,432,859 A | * | 7/1995 | Yang et al. | 381/71.11 |
| 5,659,583 A | * | 8/1997 | Lane | 329/349 |
| 5,727,072 A | * | 3/1998 | Raman | 381/94.2 |
| 5,933,421 A | | 8/1999 | Alamouti et al. | 370/330 |
| 5,995,567 A | * | 11/1999 | Cioffi et al. | 375/346 |
| 6,018,643 A | | 1/2000 | Golemon et al. | 455/63 |
| 6,035,048 A | * | 3/2000 | Diethorn | 381/94.3 |
| 6,052,420 A | * | 4/2000 | Yeap et al. | 375/258 |
| 6,101,399 A | * | 8/2000 | Raleigh et al. | 342/367 |
| 6,236,838 B1 | | 5/2001 | Golemon et al. | 455/67.1 |
| 6,363,345 B1 | * | 3/2002 | Marash et al. | 704/205 |
| 6,377,637 B1 | * | 4/2002 | Berdugo | 375/285 |
| 6,456,673 B1 | * | 9/2002 | Wiese et al. | 329/318 |

* cited by examiner

Primary Examiner—Chi Pham
Assistant Examiner—Khanh Cong Tran
(74) Attorney, Agent, or Firm—April M. Mosby; Wade James Brady, III; Frederick J. Telecky, Jr.

(57) ABSTRACT

A system and method facilitate estimating noise in a received signal. The received signal includes a plurality of data tones. Noise is estimated for a selected subset of data tones for each data burst, such that noise estimates for all data tones can be computed over a plurality of data bursts. As a result of spreading the noise estimates over more than one burst, the overall computations associated with obtaining the noise estimates can be reduced based on the size of the respective subsets. The updated data tone noise estimates further can be employed in subsequent processing, such as in beamforming calculations.

42 Claims, 7 Drawing Sheets

DECIMATED NOISE ESTIMATION AND/OR BEAMFORMING FOR WIRELESS COMMUNICATIONS

TECHNICAL FIELD

The present invention relates generally to processing of communications signals and, more particularly, to a system and method to perform decimated noise estimation and/or beamforming for use in a communications system.

BACKGROUND OF THE INVENTION

Various techniques have been developed to facilitate communication of data signals over an associated communications path. The particular communications protocol employed generally depends on the transmission medium, the available bandwidth resources, and other design considerations. Regardless of the type of communications system being employed, noise and distortion often are introduced into data signals transmitted over an associated communications path, including both wired and wireless systems.

Wireless communications systems, such as cellular and personal communications systems, operate over limited spectral bandwidths. Accordingly, multiple access protocols have been developed and used in wireless communications systems to increase bandwidth efficiency. Examples of multiple carrier protocols include Frequency Division Multiple Access (FDMA), Time Division Multiple Access (TDMA), Code Division Multiple Access (CDMA), and Space Division Multiple Access (SDMA). A particular type of FDMA protocol is Orthogonal Frequency Division Multiplexing (OFDM). Features from these and other multiple-access techniques also have been combined in an effort to make highly efficient use of the scarce bandwidth resource to increase the quality of service.

In a wireless system, in which data signals are transmitted through space as modulated electromagnetic waves, distortion and noise can result from interference with other signals within the same frequency range and path as well as multipath dispersions. Multipath dispersions occur when signals propagate along different or reflected paths through a transmission medium to a receiving destination. For example, radio transmissions or data signals that travel through the space can be reflected off trees, vehicles, houses, larger buildings, and terrain features such as mountains and hills. The radio transmissions further are subjected to fading and interference. Fading involves fluctuations in amplitude of a signal, while interference involves unwanted frequencies in the same frequency band.

Multipath scattering effects alter or distort the signal spectrum when compared to the spectrum as transmitted. The effects are different at different frequencies across the signaling band. At some frequencies, the multipath signals add constructively to result in an increased signal amplitude, while at other frequencies the multipath signals add destructively (out of phase) to cancel or partially cancel the signal, resulting in reduced signal amplitude.

A wireless communication system is designed to compensate for interference due to noise and the deleterious effects of multipath dispersion. However, in order to compensate for the noise, an indication of the noise in the signal must first be determined. Thus, it is desirable to know how much noise and/or interference is present in the system. Generally, noise can be measured relative to the signal as a ratio, such as a signal-to-noise ratio (SNR) and a signal-to-interference-to-noise ratio (SINR). The noise/interference levels are monitored and used to facilitate demodulation of the incoming signal, such as by assigning a confidence level to the data tones of the received signal. Accordingly, it is desirable to efficiently and accurately estimate the noise/interference in a received signal.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a noise estimation system for a communications system capable of improving system performance. The noise estimation system includes a selector that selects a subset of data tones (or carrier tone frequencies) from a given data burst. Noise estimates are computed for the data tones in the selected subset. The noise estimates can be used to update previously computed noise estimates. By controlling how the data tones in each subset are selected, such as based on a burst counter that monitors the received data bursts or other criteria, one can reduce the number of calculations required for each data burst.

For example, the noise estimates can be performed at every other, every fourth, or every $n^{th}$ data tone, where n is a natural number (e.g., an integer>0). Alternatively, data tones can be organized into consecutive subsets of data tones. After the noise estimates for all data tones have been updated, the data tone selection criteria can be reset to perform additional noise estimates for such tones. The updated noise estimates further can be stored, such as in internal memory, for use in subsequent processing.

In a particular aspect of the present invention, the noise estimates for the data tones can be employed in beamforming computations. Because the noise estimates have been decimated in accordance with the present invention, the overhead associated with signal processing requirements for beamforming also are reduced, thereby improving the level of system performance.

The following description and the annexed drawings set forth in certain illustrative aspects of the invention. These aspects are indicative, however, of but a few ways in which the principles of the invention may be employed. Other advantages and novel features of the invention will become apparent from the following detailed description of the invention when considered in conjunction with the drawings.

DETAILED DESCRIPTION OF THE INVENTION

The present invention provides a system and method to estimate noise in a received signal, such as received over a wired (e.g., electrically conducting or optical) or wireless medium. For purposes of brevity, the following description is described with respect to a wireless signal. The received signal can be partitioned into bursts, which contain a specified number of data tones. Noise is estimated for a selected subset of data tones of the received signal by decimating the received signal, such as to compute a partial noise estimate. The results of the computed partial noise estimate, for example, can be combined with one or more noise estimates for other frequency portions of the received signal to provide an aggregated indication of estimated noise for the received signal. In this way, the noise estimation process can be distributed over g data bursts, where g is a natural number, so that noise estimation for all frequencies in the received signal or burst will be updated every g data bursts. Accordingly, a larger value of g results in partial noise estimates being performed for a smaller subset of the frequencies associated with each data burst, which can significantly reduce the number of system computations and improve system performance.

Figure 1:
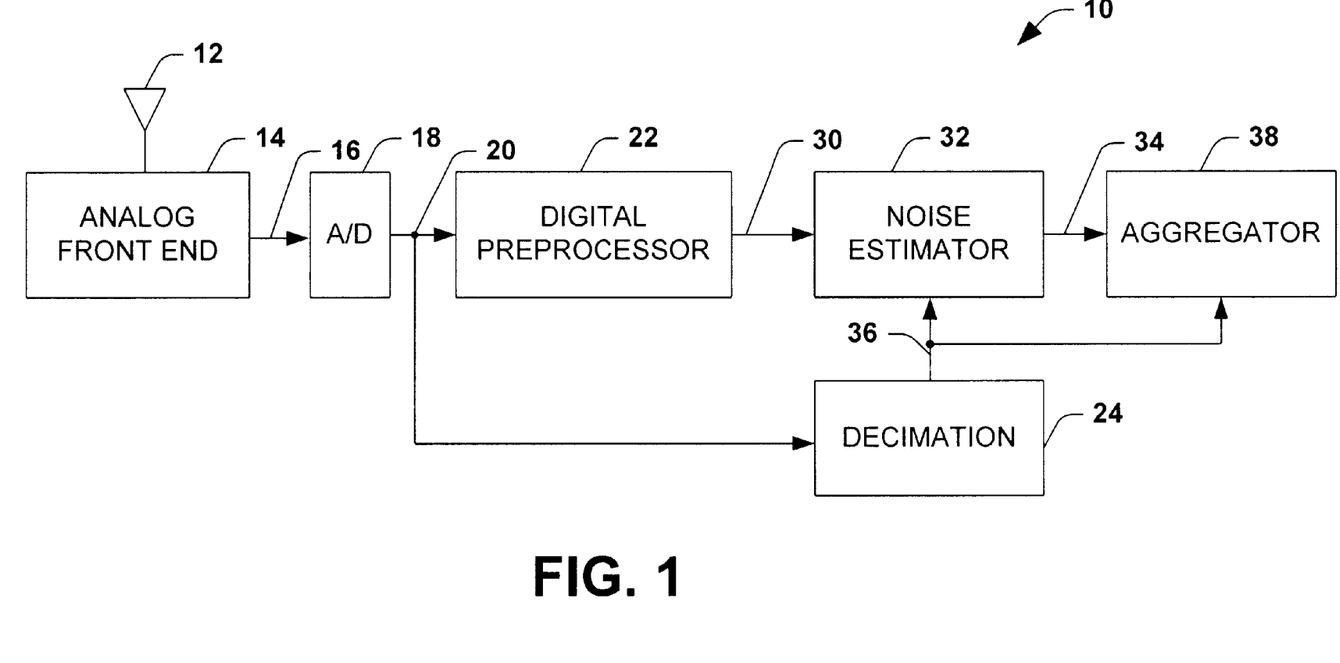
FIG. 1 is a functional block diagram of a receiver that includes a noise estimator in accordance with an aspect of the present invention.

FIG. 1 illustrates a schematic block diagram of a wireless receiver system 10 in accordance with an aspect of the present invention. The receiver system 10 could be implemented within a subscriber unit and/or at a head end or base station of a wireless communications system. A data signal or burst is received at an antenna 12, which captures the data signal and transmits an electric signal indicative of the received signal to an analog front end 14. The analog front end 14 can include one or more processing components. The analog front end processor 14, for example, can be programmed and/or configured to amplify the data signal, convert the data signal to an intermediate frequency (IF) and filter the data signal to eliminate signals that are outside of the desired frequency band. It is to be appreciated that many variations in receiver front end processing exist. For example, some receiver front end processing includes utilizing multiple IF frequencies and successive frequency conversions. Additional, some receivers can provide direct radio frequency (RF) sampling without IF stages.

The analog front end 14 feeds a processed analog signal 16 to one or more analog-to-digital (A/D) converters 18. The A/D converter 18 samples the analog data signal 16 at a predetermined sampling rate and provides a corresponding digitized output signal 20. The front end processor 14 also can provide automatic gain control (AGC), as is conventional, to maintain the signal strength relative to the A/D converter 18.

The A/D converter 18 is coupled to a digital preprocessor 22 that receives the digitized output signal 20. The digitized signal 20 also is provided to a decimation component 24, which can include hardware and/or software operative to decimate the digitized signal 20 to facilitate a noise estimation procedure in accordance with an aspect of the present invention.

The digital preprocessor 22, which can include a Finite Impulse Response (FIR) filter, provides additional filtering of the digitized signal 20 and reduces or decimates the sample of the digitized signal. The digital preprocessor 22 also can include digital automatic gain control to help ensure that the signal is maintained at a desired power level. The digital preprocessor 22 can include other signal processing components for converting the digitized signal 20 from the time domain to the frequency domain. By way of example, the digital preprocessor 22 is programmed and/or configured to perform a Fast Fourier Transform (FFT) on the digitized signal 20. The FFT on the digitized signal converts the signal from the time domain to the frequency domain to facilitate processing of the frequencies or tones carrying data (see, e.g., FIGS. 2 and 3).

The digital preprocessor 22 further can include a channel estimator that provides channel estimates at data tones for each data burst. By way of example, a channel estimation procedure can be implemented to compute a channel estimate using training tones for use in mitigating the effects of the interference and distortion caused by transmission of the received signal. The channel estimator can compute an intermediate channel response (e.g., a digitized data burst in the frequency domain) and/or a full channel estimate for each data burst. The digital preprocessor 22 thus provides an indication of the channel estimate, including full and/or intermediate channel responses.

The particular implementation of the digital preprocessor 22 generally is a matter of design choice, which can vary depending on the particular receiver architecture and the modulation technique being employed. Once in the frequency domain, the frequencies or tones can then be further processed and demodulated. The frequency domain usually includes tones or frequencies modulated onto carriers according to the particular communications protocol and modulation scheme being implemented.

Figure 2:
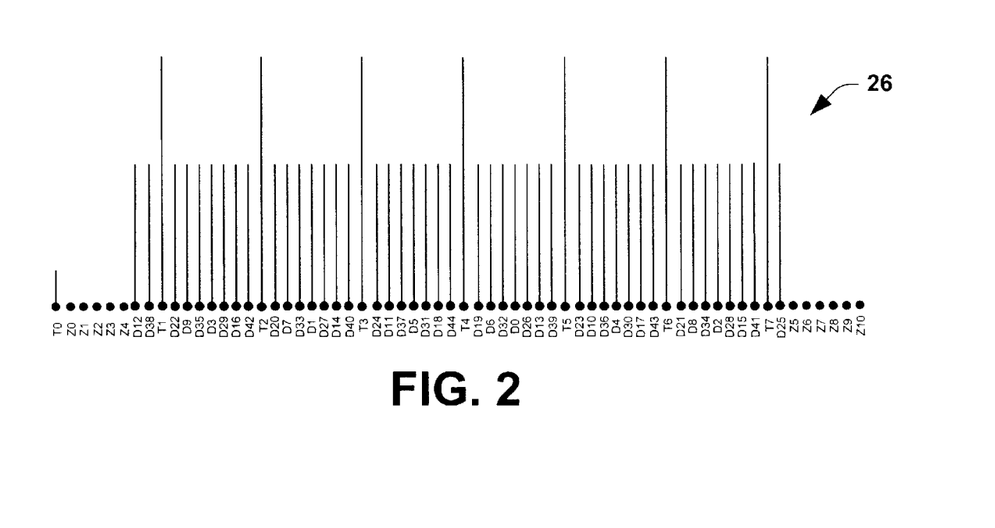
FIG. 2 is an example of a data burst showing different types of tones in a transmission signal.
Figure 3:
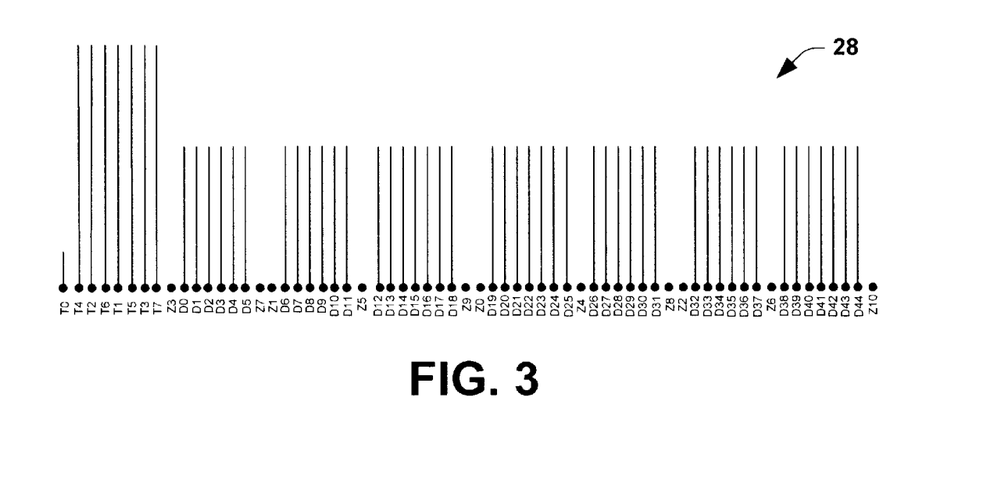
FIG. 3 is an example of a data burst, similar to that of FIG. 2, in which the order of the tones has been modified.

By way of example, the data signal or burst can be transmitted in a multiple carrier (or multiple access) format having a plurality of carrier frequencies or tones, such as shown in the examples of FIGS. 2 and 3. It is to be understood and appreciated that any arrangement and modulation for the tones can be implemented in accordance with an aspect of the present invention. A multiple carrier format allows multiple users to reuse the same communications resources while maintaining the identity of each user.

By way of further example, one special type of multiple carrier protocol is referred to as Orthogonal Frequency Division Multiplexing (OFDM). In general, OFDM is a block-oriented modulation scheme that maps a number of data symbols into a number of orthogonal carriers separated by a distance 1/T, where T is a block period. OFDM is a technique by which data is transmitted at a high rate by modulating several low bit rate carriers in parallel rather than one single high bit rate carrier. OFDM is particularly useful in the context of Digital Audio Broadcasting, High Definition Television (HDTV), and Asymmetric Digital Subscriber Lines (ADSL), all of which can benefit from the present invention. OFDM can also be useful in satellite television systems, cable television, video on demand, interactive services, mobile communication devices, voice services and Internet services.

An advantage of the OFDM is that intersymbol interference due to signal dispersion in the transmission channel can be reduced by inserting a guard time interval, known as the cyclic prefix, between the transmission of a subsequent symbol. This helps remove intersymbol interference, thereby alleviating the need for equalizers as required by most single carriers. The guard time allows delayed copies (e.g., reflections) of the main symbol to die out before the receiver receives the succeeding symbol. Due to this property, OFDM has gained popularity in high data rate systems including wireless broadband applications.

In transmission of a data signal, an OFDM modulator converts a serial data stream into a block of N complex carriers, which can include zero tones, training tones and data tones. The sum of the individual carriers, of which amplitude and phase can be modulated, correspond to a time domain waveform that can be generated using an Inverse Discrete Fourier Transform (IDFT). The Inverse Fast Fourier Transform (IFFT) is a well known efficient implementation of the IDFT that performs an N-point IDFT transform, where N is the number of tones. The guard time is inserted into the output of the IDFT and filled in with a copy of the symbol (called a cyclic prefix) to preserve the orthogonality between carriers. At the receiver end, a data signal or data burst is received in the time domain and converted back into the frequency domain employing an FFT for extraction of the symbols from the data burst. The frequency domain signal is comprised of a plurality of data tones, training tones and zero tones. The training tones are transmitted at known magnitude and phase and employed in determining the channel estimate for use in compensating the data tones due to the effects of the channel on the tones.

In an OFDM based communications system, data bursts divide the OFDM carriers into a plurality of N tones or carrier frequencies. FIG. 2 illustrates an example of a frequency-domain representation of a Quadrature Amplitude Modulation (QAM) data burst 26 in which N tones are arranged in linear order. Each tone is modulated to contain a number of symbol values according to the QAM mode (e.g., 2, 4, 16, 32, 64, 128, 256 etc.) being employed. The training tones (e.g., indicated as T0 through T7) include the leftmost carrier, and are generally evenly spaced apart with an interval of N/v carriers, where v is the number of training tones. Of the remaining N-v carriers, $N_{data}$ contain data tones (e.g., indicated as D0 through D44), and $N_{zero}$=N-v-$N_{data}$ contain zero tones (e.g., indicated as Z0 through Z10). The zero tones are divided between the band edges. In the example of FIG. 2, $\lfloor N_{zero}/2 \rfloor$ zero tones are placed at the left band edge, and $\lceil N_{zero}/2 \rceil$ zero tones are placed at the right band edge. Data tones occupy the remaining carriers in the center, which are interspersed with training tones.

The scrambled indexing of the data tones represents the frequency interleaving obtained through bit reversal. The input that is provided to the digital preprocessor 22 thus assumes that the burst is arranged in a predetermined order so as to enable extraction and processing of the different types of tones. To facilitate processing of the data burst, the tones can be accepted and/or stored in bit-reversed order, such the burst data 28 depicted in FIG. 3. In the bit-reversed order of FIG. 3, the training tones occupy the first v inputs. The QAM symbols of the data tones are indexed in consecutive order and zero tones are inserted as appropriate. It is to be understood and appreciated that the data burst examples in FIGS. 2 and 3 are intended only for purposes of illustration, as other arrangements and types of signal formats can be utilized in accordance with an aspect of the present invention.

Referring back to FIG. 1, the digital preprocessor 22 provides to a noise estimator 32 a signal 30 indicative of the channel estimates computed by the digital preprocessor. The noise estimator 32 also receives decimation information 36 from the decimation function 24 that identifies on which tones of the current data burst noise estimates are to be computed. The noise estimator 32 computes noise estimates for a subset of the data tones in each successive burst. The subset of tones is selected according to decimation information 36 from the decimation function 24. The computed noise estimates 34 for the selected subset of data tones are provided to an aggregator 38 to update previously computed estimates for the respective tones. The aggregator 38 combines the computed noise estimates 34 with previously computed noise estimates, such as can be stored in memory or registers, so that noise estimates for all of the data tones (or all tones of a particular type) are updated periodically.

For example, it may be desirable to perform noise estimates for $$\frac{N_{data}}{g}$$

data tones in each data burst, where g is a natural number that defines the decimation level. That is, a higher value of g results in increased level of decimation. The decimation function 24 is programmed and/or configured to repeatedly count from zero to g−1, incrementing in response to receiving each burst and repeating the count after reaching g−1. The decimation function 24 provides decimation information 36 that enables the noise estimator 32 to estimate noise for a different set of $$\frac{N_{data}}{g}$$

data tones for each count value between 0 and g−1, where $N_{data}$ is the number of data tones. The decimation function 24 further can provide the noise estimator 32 index values that map to a corresponding set of $$\frac{N_{data}}{g}$$

data tones on which noise estimates are to be performed for the current data burst.

Alternatively, the decimation function 24 simply can provide a count value to the noise estimator 32, with the noise estimator selecting the data tones on which noise estimates are computed based on the count value. The selected subset of data tones can be spaced throughout the frequency spectrum or be grouped in other arrangements of tones. For each data burst, the aggregator 38 receives noise estimates for the selected subset of the data tones and combines the noise data with previously computed noise estimates for the other data tones. Of course, when the receiver is first activated, default values could be used for data tone noise estimates or the system can delay subsequent processing that requires noise estimates until estimates have been computed for all data tones. As a result, the noise estimator 32 updates noise estimates for all $N_{data}$ data tones every g data bursts.

While the foregoing example determines to estimate noise for a different subset of data tones based on receiving a data burst, it is to be understood and appreciated that the noise estimator can be programmed and/or configured to decimate noise estimation computations in response to criteria different from a data burst in accordance with an aspect of the present invention. For example, it might be desirable to compute and update noise estimates for some or all data tones after receiving a certain number of data bursts or based on a count cycle that increments more slowly than every data burst. Additionally or alternatively, the decimation level can be variable so as to change as a function of the detected noise level, such as employing a higher decimation level when a relatively low level of noise is present and lower decimation level when a relatively high level of noise exists. Those skilled in the art will further understand and appreciate that whatever basis is used to control decimation at the noise estimator, the decrease in noise computations should be balanced with maintaining an acceptable level of system performance.

Figure 4:
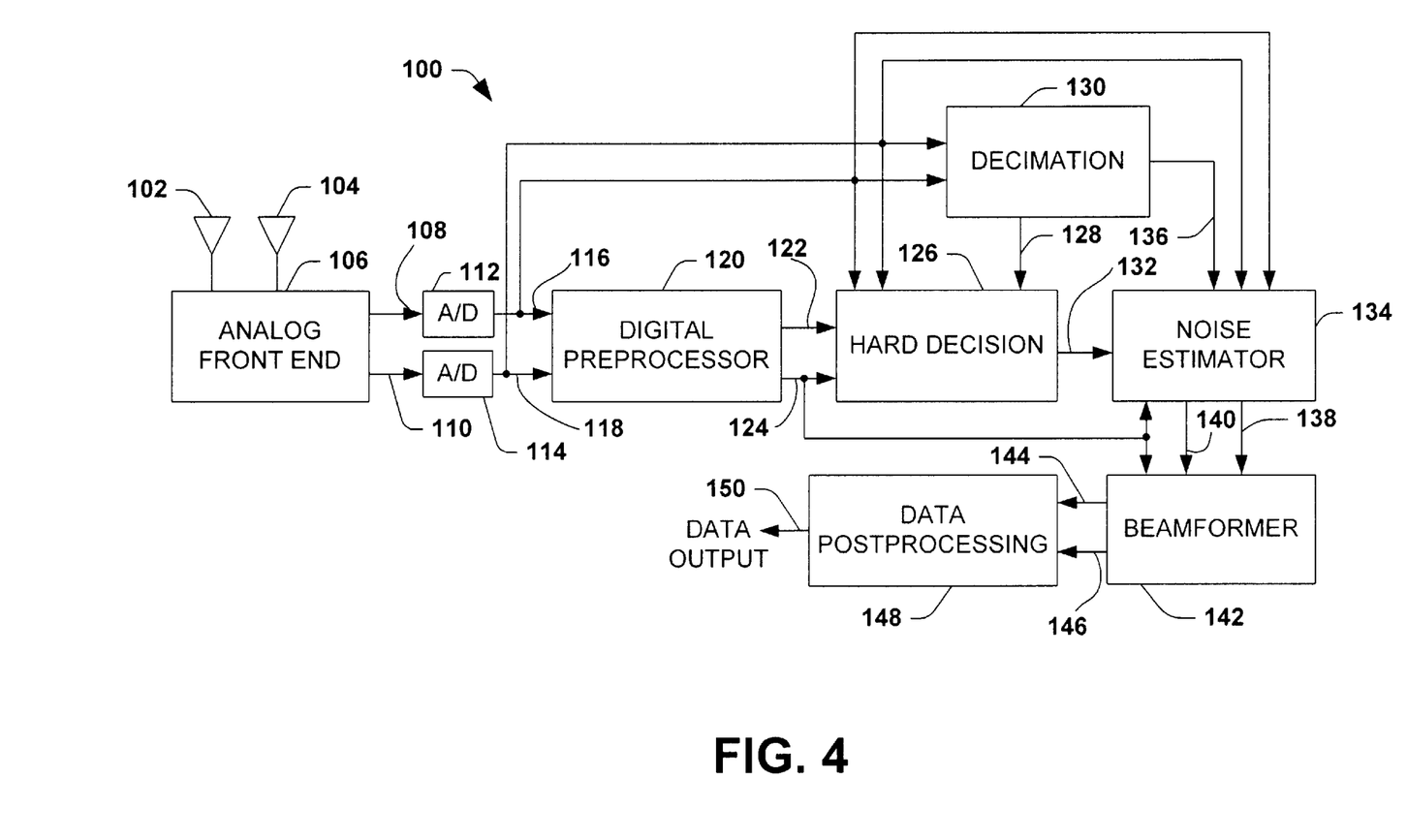
FIG. 4 is a functional block diagram of a receiver that includes a noise estimator and beamformer in accordance with an aspect of the present invention.

FIG. 4 illustrates an example of another wireless receiver system 100 implemented in accordance with an aspect of the present invention. The receiver system 100 is similar to the system 10 shown and described with respect to FIG. 1 and could be implemented within a subscriber unit and/or at a head end or base station of a wireless communications system. Briefly stated, a wireless data signal is received at a pair of antennas 102 and 104 coupled to an analog front end 106. The analog front end 106, for example, can be programmed and/or configured to amplify and convert the data signals from each antenna 102, 104 to an intermediate frequency (IF). The analog front end 106 further can filter the respective data signals to eliminate undesirable signals.

The front end 106 feeds processed analog signals 108, 110 to respective A/D converters 112, 114 associated with each antenna 102, 104. The A/D converters 112, 114 sample the analog data signals 108, 110 at a predetermined sampling rate and provide respective digitized output signals 116, 118.

The A/D converters 112 and 114 are coupled to a digital preprocessor 120 that receives the digitized output signals 116, 118. The digital preprocessor 120 provides additional filtering of the digitized signals 116 and 118, such as to reduce the sample of the digitized signals. The digital preprocessor 120 also can include digital automatic gain control to help ensure that the signals are maintained at a desired power level. The digital preprocessor 120 also can include other signal processing components for converting the digitized signals 116 and 11 8 from the time domain to the frequency domain, such as by implementing an FFT algorithm. The particular implementation of the digital preprocessor 120 can vary, for example, depending on the particular receiver architecture and/or modulation scheme being employed. The digital preprocessor 120 further can include a channel estimator programmed and/or configured to provide an indication of the magnitude and phase of the training tones (or pilot tones) of the data signals received at the respective antennas 102 and 104.

By way of example, the channel estimator of the preprocessor 120 receives filtered, frequency domain digitized signals (e.g., conforming to OFDM) for the respective antennas 102 and 104. The channel estimator samples the training tones from the data signal. The channel estimator portion of the preprocessor 120 can compute intermediate channel responses as well as full channel estimates for the respective input signals 116 and 118. The intermediate channel response can be employed to compute an indication of training tone noise, for which a variance and correlation matrix can be determined. Averaging also can be employed to provide an averaged indication of the training tone noise. The digital preprocessor 120 thus provides outputs 122 and 124 to a hard decision component 126, which outputs can correspond to the indication of training tone noise and channel estimates.

The hard decision component 126 is programmed and/or configured to compute hard decisions (e.g., symbol estimates) for some of the data tones in accordance with an aspect of the present invention. In particular, the hard decision component 126 receives decimation information 128 from a decimation function 130. The hard decision component 126 thus computes hard decision for only for a selected subset of one or more of the data tones (e.g., at specified frequency values) based on the decimation information 128.

The decimation function 130, for example, monitors the incoming signals 116, I118 and increments a counter with each data burst, such as counting from a minimum to a maximum count value. When the maximum value is reached, the counter can be reset to the minimum value. Each count value further can map to a different subset of the data tones, such that the hard decision component computes hard decisions for a specific subset of data tones according to the count value. The hard decisions, for example, are computed for each of the data tones identified in the subset as a function of the noise estimate for the nearest training tone as well as the channel estimates and digitized signals received at each antenna for such data tones. The hard decision component 126 provides the computed hard decisions 132 for the selected subset of data tones to a noise estimator 134. Accordingly, the decimation information 128 can be any information that identifies a subset of data tones (or based on which a subset can be determined) for a given data burst for which the hard decisions are to be computed.

The noise estimator 134 is programmed and/or configured to compute a decimated estimate of noise for the selected data tones in the data burst in accordance with an aspect of the present invention. The decimated noise estimate, for example, is computed for each of the selected data tones as a function of the digitized signal, the channel estimate and the hard decision that have been computed for each antenna. The noise estimator 134 receives decimation information 136 from the decimation function 130. The decimation usually is the same as that provided to the hard decision component 126, such that noise estimates are computed for the same tones as the hard decisions. It is to be understood and appreciated that different decimation information also could be used so that a different desired decimation rate is employed by the noise estimator 134 than by the hard decision component 126.

The noise estimation also can include a variance and correlation computation performed on the initial noise estimates for each of the antenna signals to provide a covariance matrix indicative of the noise estimates for each of the selected data tones in 1the respective received signals. Averaging also can be employed to smooth the respective noise estimates 134 for each of the data tones in the selected subset. The resulting noise estimates, which include the data tones belonging to the selected subset of tones, can be used to update previously computed noise estimates for such data tones. In general, the frequency in which noise estimates for all data tones are updated depends on the number of tones in each data burst and the number of tones in each subset of tones for which the decimated noise computations are performed.

The noise estimator 134 provides noise estimates 138, 140 for each respective antenna 102, 104 to a beamformer 142. The preprocessor 120 also provides channel estimates for the respective antennas 102 and 104 to the beamformer 142. The beamformer 142 is programmed and/or configured to compute an indication of the signal relative to the noise for the data tones based on the signal value, the updated noise estimates and the channel estimates for each respective data tone.

By way of example, the beamformer 142 computes soft decisions and NSR estimates for each data tone in the present data burst based on the updated noise estimates as well as the channel responses and signal values associated with each antenna 102, 104 for each respective data tone.

Because noise estimates are computed for data tones according to the decimation rate, in accordance with an aspect of the present invention, the overall number of computations required to obtain values needed to perform beamforming computations is significantly reduced. The additional overhead associated with controlling the decimation is less than that required to compute a corresponding noise estimate for each data tone in every data burst. Those skilled in the art will understand and appreciate that the computational efficiency can be increased as a function of the decimation rate, but that this should be balanced with maintaining an acceptable level of system performance. Further, it may be desirable to employ feedback from the noise estimator to the decimation function to adjust the decimation level according to the amount of noise computed.

The beamformer 142 provides outputs 144 and 146 to a data postprocessing block 148, which outputs, for example, contains the computed soft decisions and NSR estimates. The data postprocessing block 148 can include slicing for bit constellation mapping data. Additionally or alternatively, the data postprocessing block 148 can performs error correction and decoding of the weights associated with the data symbols, such as based on the beamforming computations. The data postprocessing block 148 outputs the data 150 for further decoding of other data layers included within the data that has been received at the receiver 100.

Figure 5:
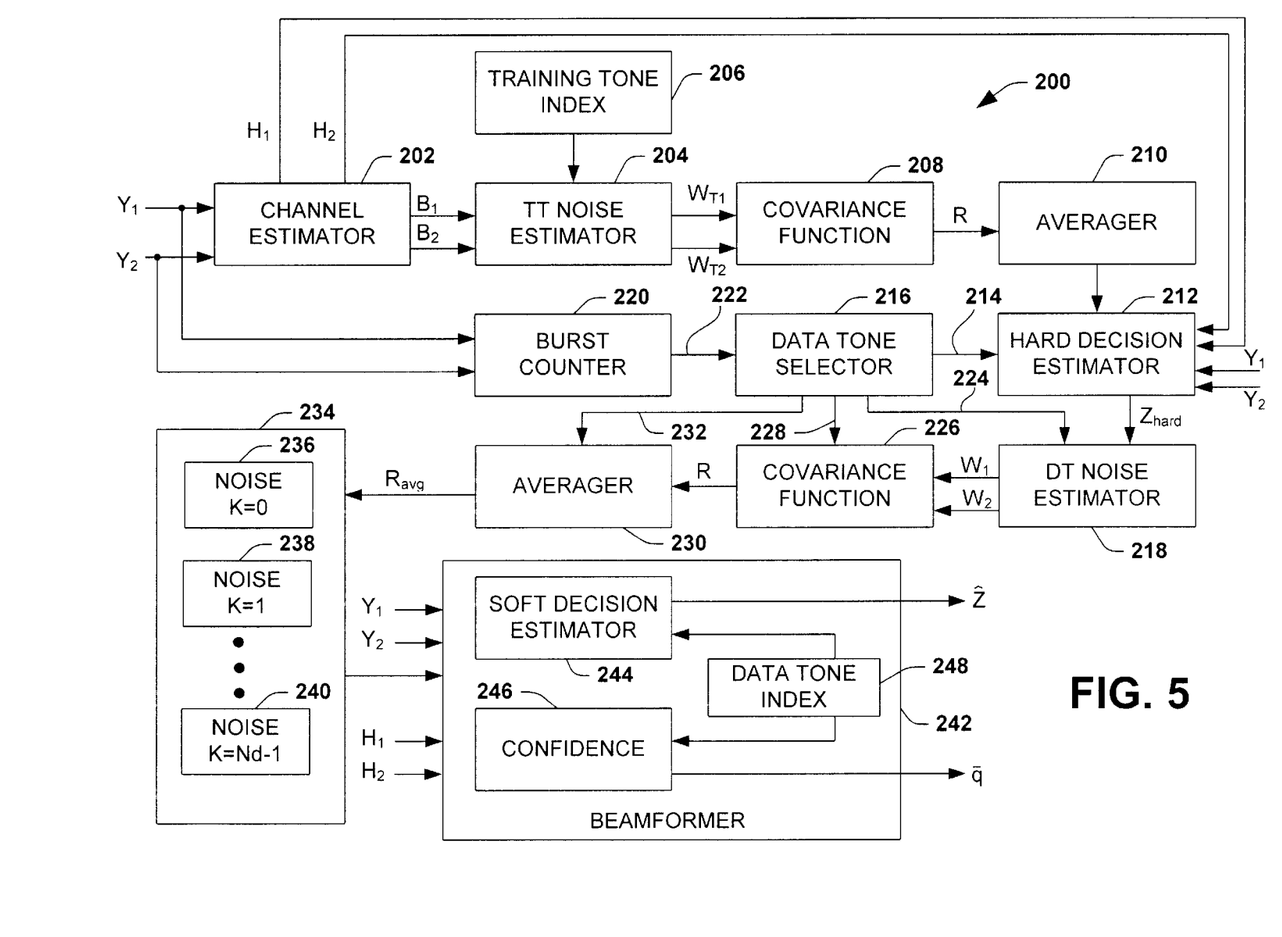
FIG. 5 is a functional block diagram illustrating an example of noise estimation and beamforming in accordance with an aspect of the present invention.

Additional aspects of the present invention will be better appreciated with respect to FIG. 5, which depicts a functional representation for part of a receiver system 200 in accordance with an aspect of the present invention. The receiver portion 200 includes a channel estimator 202 that receives frequency domain data bursts or signals $Y_1$ and $Y_2$, such as have been digitized, filtered, and converted into the frequency domain by an appropriate FFT algorithm. The signals $Y_1$ and $Y_2$ correspond to signals received by different antennas of the receiver, including symbol values for each carrier frequency in the respective received signals. The channel estimator 202 provides an indication of the magnitude and phase of training tones for data bursts that are received.

By way of example, the channel estimator 202 is programmed and/or configured to sample training tones from each of the signals $Y_1$ and $Y_2$. Scaling and demodulation can be applied to the sampled training tones to facilitate channel estimation. An IFFT algorithm is applied to the extracted training tones of each signal to convert the respective signals into time domain impulse responses. Additional scaling and filtering can be performed on the impulse response associated with each of the signals $Y_1$ and $Y_2$. A suitable FFT can then performed on the impulse responses to convert the time domain responses back into frequency domain signals. To enable certain subsequent processing, the channel estimator 202 can provide intermediate channel responses $B_1$ and $B_2$ for the respective input signals Y1 and Y2, such as might correspond to training tones in each signal after the phase contribution has been removed. Further, the channel estimator 202 provides full channel estimates $H_1$ and $H_2$ for the respective input signals $Y_1$ and $Y_2$, which have been processed as indicated above.

The intermediate channel responses $B_1$ and $B_2$ are provided to a training tone noise estimator 204 in accordance with an aspect of the present invention. The training tone noise estimator 204 is programmed and/or configured to compute an estimate of noise for the training tones as a function of the intermediate channel responses $B_1$ and $B_2$, such as can include an indication of the difference of training tones in a current data burst relative to respective training tones in a previous data burst. The noise estimator 204 also can implement synchronization to compensate for detected slips (e.g., phase lead or phase lag) associated with the intermediate channel responses $B_1$ and $B_2$. The synchronization, commonly performed with a twiddle factor, can be applied to one of the terms of the vector algorithm, such as the training tone associated with the previous data burst. For example, forward or backward slips (phase lead or lag) can occur as a result of interference during transmission and/or as a result of the high data rates of the signals being transmitted.

A training tone index 206 is operative to index the computation of the function 206 to increment through the training tones in the intermediate channel respones $B_1$ and $B_2$. For example, to facilitate computing noise at the training tones, the index 206 can implement a bit-reversed order of the training tones (See, e.g., FIG. 3), which index values are provided to the function 206 to perform the estimation computation relative to each of the training tones being indexed. Other implementations of indexing also can be utilized by the training tone noise estimator 204.

By way of further illustration, Eq. 1 represents a computation that can be performed by the noise estimator 204, including a slip adjustment component (e.g., twiddle factor) that is applied to the intermediate channel response for a previous data burst. That is, Eq. 1 can be used to provide respective noise vectors $W_{T1}$ and $W_{T2}$ for the training tones of the intermediate channel responses B[r,b] and B[r,b−1].

$$W_T[k] = B[r, b] - e^{j\left(\frac{2\pi k}{v} - \pi\right)s} B[r, b-1] \qquad \text{Eq. 1}$$

where:

B corresponds to the intermediate channel responses;

b is an index for the current data burst;

k is an index for each of the training tones, e.g., $k \in \{0, 1, \ldots, v-1\}$;

s is a slip value for identifying slip characteristics (e.g., s=0 indicates no slip; s=−1 indicates forward slip; and s=1 indicates backward slip); and r is the bit reversed value of the training tone index k.

The training tone noise estimator 204 provides the quantities $W_{T1}$ and $W_{T2}$ to a covariance function 208 that is operative to compute the variance and correlation of the training tone noise based on the noise estimates $W_{T1}$ and $W_{T2}$. For example, the covariance function 208 constructs a covariance matrix $R_T$ based on the noise vectors $W_{T1}$ and $W_{T2}$, which provides an estimate of the training tone noise for each of the received signals.

By way of illustration, the covariance of the training tone noise can be computed from the noise vectors $W_{T1}$ and $W_{T2}$ of Eq. 1 as follows:

$$R_T[k] = \begin{bmatrix} |W_{T1}[k]|^2 & W_{T1}[k] \cdot W_{T2}^*[k] \\ W_{T1}^*[k] \cdot W_{T2}[k] & |W_{T2}[k]|^2 \end{bmatrix} \qquad \text{Eq. 2}$$

$$= \begin{bmatrix} \sigma_{T1}^2[k] & \sigma_{T12}[k] \\ \sigma_{T12}^*[k] & \sigma_{T2}^2[k] \end{bmatrix}$$

where $k \in \{0, 1, \ldots, v-1\}$

Because of symmetry, only four real elements are actually computed; namely, the two diagonal elements and the real and imaginary parts of either off-diagonal element.

The covariance function 208 provides the covariance of the training tone noise $R_T$ to an averager 210. For example, the averager 210 can be a filter (e.g., a single pole filter) operative to smooth the training tone noise values over time. The averager 210 also can be turned ON or OFF, as needed, such as by having its operation be selectable.

Following the example of using a single pole filter for the averager 212, the computation for the averaged training tone noise can be expressed as:

$$R[k, b] = (1 - \beta) \cdot R_T[k, b-1] + 1/2 \cdot \beta \cdot R_T[k, b] \quad \text{Eq. 3}$$

where $k \in \{0, 1, \ldots, v-1\}$;

b is the index for the current data burst, and
$\beta = 2^{-p}$, where $p \in \{0,1,2,3,4\}$.

Once the training tone noise estimates have been computed, they can be employed by a beamformer or other subsequent processing that might require an estimation of the training tone signal noise.

In the example of FIG. 5, the averager 210 provides an indication of the average training tone noise R to a hard decision estimator 212. The hard decision estimator 212 receives information 214 from a data tone selector 216 that identifies desired data tones for which data tones hard decisions are to be computed. The hard decision estimator 212 computes the hard decisions for the desired data tones of the data signal as a function of the channel estimates H1 and H2, the digitized channel signals Y1 and Y2 and the average training tone noise R. The hard decision estimator 212 provides an indication of the hard decisions $Z_{hard}$ to a data tone noise estimator 218.

By way of example, the hard decisions $Z_{hard}$ (e.g., symbol estimates) for the desired data tones can be computed as follows:

$$Z_{hard}[k] = \frac{[H_1^*[r] \; H_2^*[r]][adjR[t]] \begin{bmatrix} Y_1[r] \\ Y_2[r] \end{bmatrix}}{[H_1^*[r] \; H_2^*[r]][adjR[t]] \begin{bmatrix} H_1[r] \\ H_2[r] \end{bmatrix}} \quad \text{Eq. 4}$$

where:
k ∈{desired data tones identified by the selector 216}
r is the bit reversed index for data tone k
l is the linear index for data tone k; and $$t = \left\lfloor \frac{v \cdot l}{N} + \frac{1}{2} \right\rfloor \cdot \frac{N}{v}$$

In accordance with an aspect of the present invention the desired data tones can be any subset of the data tones, such that hard decisions are computed for different subsets of data tones over a plurality of data bursts. The hard decisions for the desired subset of data tones can be stored in memory operatively associated with the hard decision estimator (e.g., RAM, SDRAM, data registers, etc.).

By way of example, the data tone selector 216 can be coupled to a burst counter 220 that increments in response to each data burst received, such as based on $Y_1$ and/or $Y_2$. The burst counter 220 provides a burst count value 222 to the data tone selector 216, which selects a corresponding subset of the data tones according the burst count value. It is to be understood and appreciated that the data tone selector 216 can group data tones into subsets organized by virtually any criteria, which might vary according to the number of data tones per data burst, the subsets being employed and/or the desired performance.

For example, if there are g subsets, then each data burst can result in the hard decision estimator 212 computing hard decisions for a set of about $$\frac{N_{data}}{g}$$

data tones (where g is a natural number), which are shifted into the hard decision estimator 212 with each data burst. The subset of data tones can be selected from successive data tones or from tones arranged at spaced intervals throughout the frequency spectrum. Different subsets also can include different numbers of data tones. Because a subset includes less than all data tones, the hard decision estimator 212 requires more than one data burst to compute hard decisions for all data tones in the frequency spectrum. Additionally, to provide added redundancy, different subsets of data tones can include some of the same 11data tones, if desired.

In accordance with an aspect of the present invention, the data tone noise estimator 218 computes data tone noise estimates $W_1$ and $W_2$ for a subset of desired data tones. The data tone noise estimates can be computed as a function of the digitized data signals $Y_1$, $Y_2$, the channel estimates $H_1$, $H_2$ and the computed hard decisions $Z_{hard}$. The subset of desired data tones can be selected in a manner similar from that described above with respect to the hard decision estimator 212. That is, the data tone noise estimator 218 receives information 224 from the data tone selector 216, which information identifies the subset of data tones for which the noise estimates are to be computed. The subset can be the same subset of data tones or it could be different from that employed by the hard decision estimator 212.

By way of illustration, the data tone noise estimator 218 can be programmed and/or configured to compute noise estimates for the desired data tones, as follows:

$$W[k] = Y[r] - H[r]Z_{hard}[k] \quad \text{Eq. 5}$$

where:
k ∈{desired data tones identified by the selector 216}, and
r is the bit reversed index for data tone k The data tone noise estimator 218 provides the computed noise estimates $W_1$ and $W_2$ to a covariance function 226 that computes a matrix R for the variance and correlation of the computed data tone noise $W_1$ and $W_2$. The covariance is performed on a selected subset of the data tones in a current data burst, such as based on information 228 from the data tone selector 216. The subset usually is the same subset of data tones as was employed to compute the data tone noise $W_1$ and $W_2$, although a different subset of tones could be used. Eq. 6 shows an example of how the covariance can be computed as follows:

$$R[r] = \begin{bmatrix} |W_1[k]|^2 & W_1[k] \cdot W_2^*[k] \\ W_1^*[k] \cdot W_2[k] & |W_2[k]|^2 \end{bmatrix} \quad \text{Eq. 6}$$

$$= \begin{bmatrix} \sigma_1^2[k] & \sigma_{12}[k] \\ \sigma_{12}^*[k] & \sigma_2^2[k] \end{bmatrix}$$

where:
k ∈{desired data tones identified by the selector 216}
r is the bit reversed index for data tone k After the noise on the desired data tones has been computed, the processes associated with Eqs. 4–6 can be repeated for desired zero tones. However, hard decisions are not required for the zero tones because no data is being transmitted at these particular frequencies. The covariance function 226 provides the covariance of the noise estimates R to an averager 230.

The averager 230 is programmed and/or configured to smooth out discrete effects of the noise estimates. For example, the averager can be implemented as a sliding window averager that computes an average of the covariance noise estimates R for desired data tones over a plurality of data bursts (e.g., over time), which average is indicated as $R_{avg}$. The averager 230 receives information 232 from the data tone selector 216 that identifies a desired subset of data tones, which the averager employs to select desired data tones for which the averaging is to occur. The information 232 can cause the averager 230 to compute an average for the same tones as processed at the noise estimator 218 and/or the covariance function 226, although a different decimation rate could be employed at the averager from that used in the noise calculations.

The operation performed by the averager 230, for example, can be represented by the following equation:

$$R_{avg}[r] = \frac{1}{N_{term}} \sum_{m=l-\beta}^{l-\beta+N_{term}} R[n] \qquad \text{Eq. 7}$$

where:

k ∈ {desired data tones identified by the selector 216} l is the linear index for data tone k r is the bit reversed index for data tone k n is the bit reversed index for data tone m $N_{term}$ is the number of terms being averaged; and $\beta = \lfloor N_{term}/2 \rfloor$ Eq. 7 thus can provide a sliding window averager that is updated for every data tone, although it does not need to be updated for every data tone. It is to be understood and appreciated that the averager 230 can accommodate any decimation rate, which further can be adjusted as a function of the determined noise. For example, it may be desirable to increase decimation rate during low noise situations and decrease the decimation rate when a greater level of noise exists.

The averager 230 is operatively associated with a register 234, which can be hardware and/or software, for storing updated values of the average data tone noise. That is, the averager 230 computes average noise values $R_{avg}$ for desired data tones based on the tone selection information 232. The computed $R_{avg}$ value for each desired data tone is used to update a corresponding register location 236, 238, or 240 with updated noise data for that data tone. As a result, the averager 230 updates at least a portion (e.g., one or more) of the register locations 236, 238, and 240 based on the noise computations performed with respect to every data burst. The average data tone noise information stored in the register 234 collectively represents data tone noise for all data tones. Accordingly, it can take several data bursts to initially populate the register 234 for all data bursts, the number of bursts varying as a function of the decimation rate being employed. Once the register 234 is initially set with noise data, the noise data for all data tones will be updated over a plurality of bursts based on the decimation rate being employed.

For example, it may be desirable to perform noise estimates for $$\frac{N_{data}}{g}$$

data tones in each data burst, where g is a natural number that defines the decimation level. That is, a higher value of g results in increased level of decimation (e.g., smaller subsets of data tones). The data tone selector 216 is programmed and/or configured to repeatedly count from zero to g−1, incrementing in response to receiving each burst and resetting the count value to zero after reaching g−1. The data tone selector 216 provides decimation information 224, 228, 232 that enables the noise estimation calculations to be performed for a corresponding set of $$\frac{N_{data}}{g}$$

data tones selected for each count value between 0 and g−1, where $N_{data}$ is the number of data tones. The averager 230 thus can provide updated average noise estimates for all $N_{data}$ data tones every g data bursts. Those skilled in the art will understand and appreciate, however, that other decimation rates (or functions) can be utilized in accordance with an aspect of the present invention.

The updated average data tone noise estimates of the register 234 are utilized by a beamformer 242 programmed and/or configured to compute an indication of signal relative to noise. By way of example, the beamformer 242 includes a soft decision estimator component 244 and a confidence component 246 that perform respective beamforming computations for the data tones. The computations at each of the beamforming components 244, 246 are indexed by a data tone index function 248 that provides an index value, which indicates for which data tone computations are to be performed. For example, the soft decision estimator component 244 computes soft decisions, indicated as output $\hat{Z}$. and the confidence component computes NSR estimates, indicated as output $\overline{q}$, based on the data tone index value. The soft decisions $\hat{Z}$ are computed for each data tone based on the time domain inputs $Y_1$ and $Y_2$, channel estimates $H_1$ and $H_2$ from the channel estimation function 202, and the computed average data tone noise $R_{avg}$ stored in the register 234. The confidence component 246 computes NSR estimates $\overline{q}$ for each data tone based on the channel estimates $H_1$ and $H_2$ from the channel estimation function, and the computed average data tone noise $R_{avg}$.

By way of further illustration, the soft decisions and NSR estimates $\hat{Z}$ and $\overline{q}$ can be computed for all data tones according to the following equations:

$$\hat{Z}[k] = \frac{[H_1^*[r] \; H_2^*[r]][\text{adj } R_{avg}[r]]\begin{bmatrix} Y_1[r] \\ Y_2[r] \end{bmatrix}}{[H_1^*[r] \; H_2^*[r]][\text{adj } R_{avg}[r]]\begin{bmatrix} H_1[r] \\ H_2[r] \end{bmatrix}} = \frac{\hat{Z}_{num}[k]}{\hat{Z}_{den}[k]} \qquad \text{Eq. 8}$$

and $$\overline{q}[k] = \frac{\det R_{avg}[r]}{\hat{Z}_{den}[k]} \qquad \text{Eq. 9}$$

where k ∈ {0,1, . . . , $N_{data}$−1} and r is the bit reversed value of the data tone index k.

Because the denominator in Eqs. 8 and 9 contains the average noise estimates, whose values are decimated, it is to be appreciated that the denominator calculations for estimates $\hat{Z}$ and/or $\bar{q}$ (e.g., $\hat{Z}_{den}[k]$) also could be decimated in accordance with an aspect of the present invention.

By way of example, $\hat{Z}_{den}[k]$ could be decimated at any desired rate (e.g., ½, ¼, ⅛, etc.), with updated data being stored in suitable memory, such as a register. Additionally or alternatively, any or all of the individual terms $H_1$, $H_2$, and $R_{avg}$, which do not depend directly on burst-by-burst data (e.g., as do $Y_1$ and $Y_2$), could be decimated at a desired rate. The decimation rates for such terms $H_1$, $H_2$, $R_{avg}$ and/or $\hat{Z}_{den}[k]$ could be independent of each other (e.g., at different rates) and further could be dynamically modified, such as a function of the noise or other signal characteristics.

In view of the foregoing, those skilled in the art will understand and appreciate that decimation, in accordance with an aspect of the present invention, enables reduced computations and processing steps, as only a portion of the data being decimated needs to be updated with each data burst. It is to be also understood and appreciated that equations 1–8 are scalable such equations. That is, while the foregoing examples have been described with respect to a two-antenna implementation, the equations could be implemented relative to data burst signals received at any number of antennas. For example, Eq. 8 can be generalized for any number of antennas and expressed as:

$$\hat{Z}[k] = \frac{[H_1^*[r] \; \cdots \; H_n^*[r]][\text{adj } R_{avg}[r]] \begin{bmatrix} Y_1[r] \\ \vdots \\ Y_n[r] \end{bmatrix}}{[H_1^*[r] \; \cdots \; H_n^*[r]][\text{adj } R_{avg}[r]] \begin{bmatrix} H_1[r] \\ \vdots \\ H_n[r] \end{bmatrix}} \quad \text{Eq. 10}$$

where n denotes the number of antennas.

Figure 6:
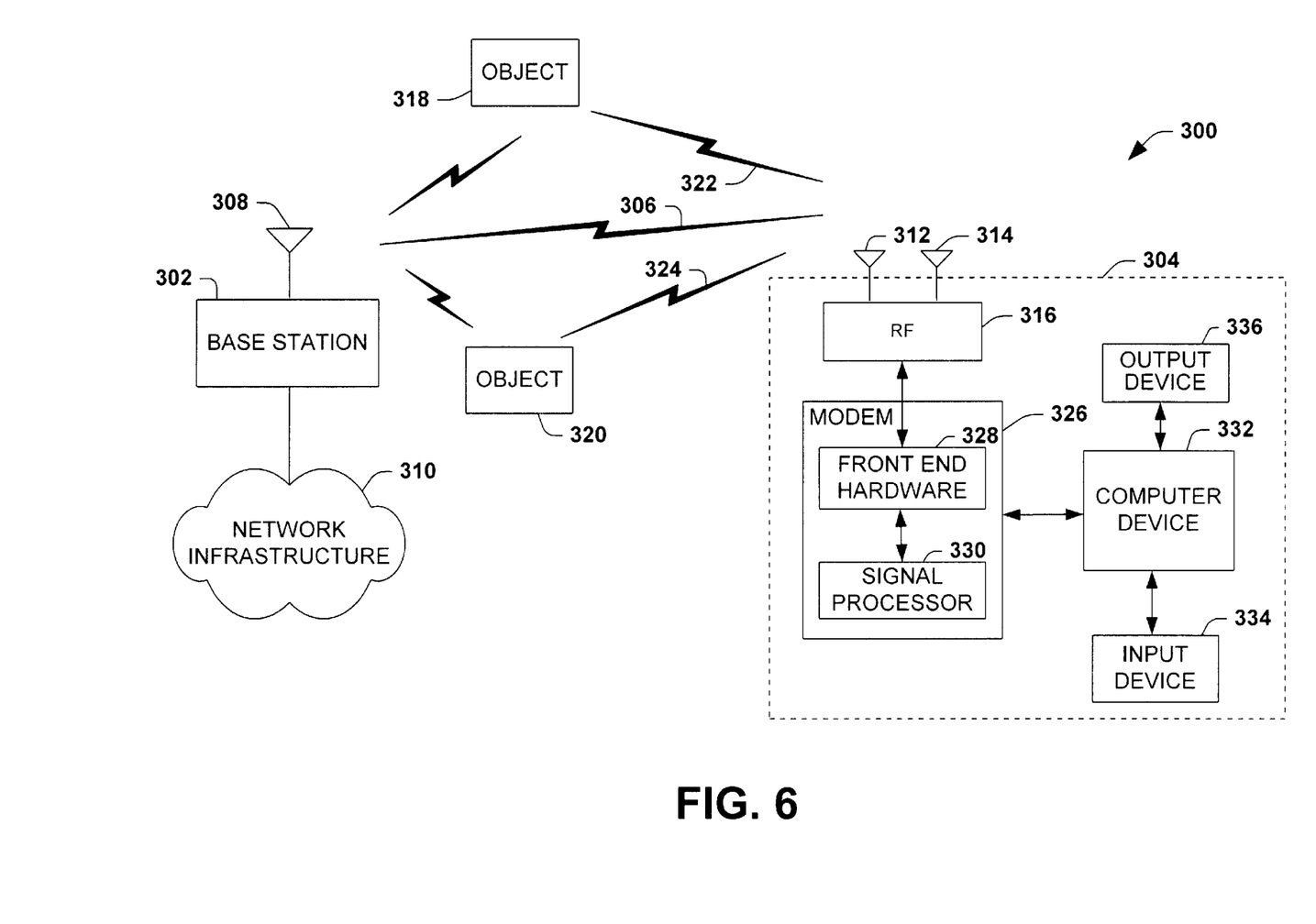
FIG. 6 illustrates an example of a wireless communications system that can employ a receiver in accordance with an aspect of the present invention.

FIG. 6 illustrates one example of a possible implementation of the present invention as it applies to a wireless communications system 300. The system includes a base station 302 and one or more subscriber units 304. The base station 302 includes a transceiver that is operative to both transmit and receive data signals 306 via an antenna system 308 (erg., one or more antennas) wirelessly through an environment to selectively communicate information to and from the subscriber units 304. The base station 302 is coupled to a network infrastructure 310 via a server (not shown) or the like. The network infrastructure 310, for example, can include the Internet, an intranet or other type of network infrastructure. The base station 302 or its associated server (not shown) are programmed and/or configured to facilitate communication of network information relative to the network infrastructure 310 using a defined network protocol (e.g., TCP/IP, Fibre channel, etc.). The network information, for example, can include interactive video and/or audio data as well as other types of data.

For each data burst from the antenna system 308, the main data burst signal 306 is transmitted and received at one or more antennas 312 and 314 operatively coupled to a RF transceiver 316. The main data burst signal 306 usually reflects off one or more objects 318 and 320 in the environment, causing each of the antennas 312, 314 to receive a plurality of reflected signals 322 and 324 in addition to the main data burst signal 306.

The transceiver 316 includes a receiving device that converts the received RF signals into corresponding electrical signals, which are transferred to a modem 326. The transceiver 316 also includes a transmitter coupled to the antennas 312, 314 for transmitting request data to the base station 302. It is to be understood and appreciated that, while the RF transceiver 316 is illustrated as being external to the modem 326 at the subscriber unit 304, the transceiver also could be integrated into the modem in accordance with an aspect of the present invention. Alternatively, the modem 326 could be incorporated into a set top box, the antenna, a personal computer, a hand-held computer, and/or other microprocessor-based appliance.

The modem 326 includes front end hardware and/or software 328 coupled to receive analog signals from the transceiver 316. The front end 328 is programmed and/or configured to amplify, filter and/or digitize the electrical signals corresponding to signals or bursts received at the antennas 312, 314. The front end 328, for example, is coupled to signal processor 330, which can be implemented as computer executable instructions within a DSP, as hardware and/or software in ASIC or as part of some other signal processing component, that is programmed and/or configured to process the digitized signal in accordance with an aspect of the present invention. That is, the signal processor 330 is operative to compute noise estimates for selected tones of the received signal. In one particular aspect of the present invention, each received signal (or burst) is processed according to a decimation rate, which can be fixed or variable, such that noise estimates are computed for a selected subset of data tones in the received signal. Noise estimates can be computed for different subsets in successive data bursts so that noise estimates are periodically updated for all data tones based on the decimation rate. Because noise estimates are computed for fewer than all data tones, the number of computations is reduced, thereby increasing overall system performance.

When the modem receives wireless signals from more than one antenna, such as in the example of FIG. 6, noise estimates are performed on signals from each of the antennas. Further, the signal processor 330 can employ the noise estimates to perform beamforming computations, such as in the form of soft decisions and NSR estimates. The computations for each data tone of a received signal are calculated based on the updated noise estimates, which, as mentioned above, are updated for all data tones periodically based on the decimation rate. Accordingly, the beamforming computations for some data tones might use noise estimates computed for previous data signals, whereas the computations for some other data tones may use noise estimates computed for the current data signal. After the beamforming computations are performed on the data tones, the signal processor 330 can perform further processing, such as hard or soft slicing and then decoding and demodulation based on the sliced constellation symbol estimates.

The modem 326 is coupled to a computer device 332, which handles additional processing steps and provides a mechanism for user interaction with the information being communicated through the communications system. The computer device 332, for example, can be a personal computer, an Internet appliance, or other microprocessor-based device operative to receive and/or send information relative to the modem 326. It is to be understood and appreciated that the modem 326 also could be integrated into the computer device 332.

The computer device 332 is coupled to an input device 334 for receiving instructions from a user directly or indirectly by a remote link. An output device 336 is also provided, so that selection information and requests can be displayed to the user. The computer device 332 can include computer-executable instructions for providing task selections, requests and control to a user and allowing a user to interact with information available over the network infrastructure 310. It will be understood and appreciated that the applicability of the present invention is not limited to a particular configuration of communications system and those skilled in the art further will appreciate many other communication implementations that can be employed in accordance with an aspect of the present invention.

Figure 7:
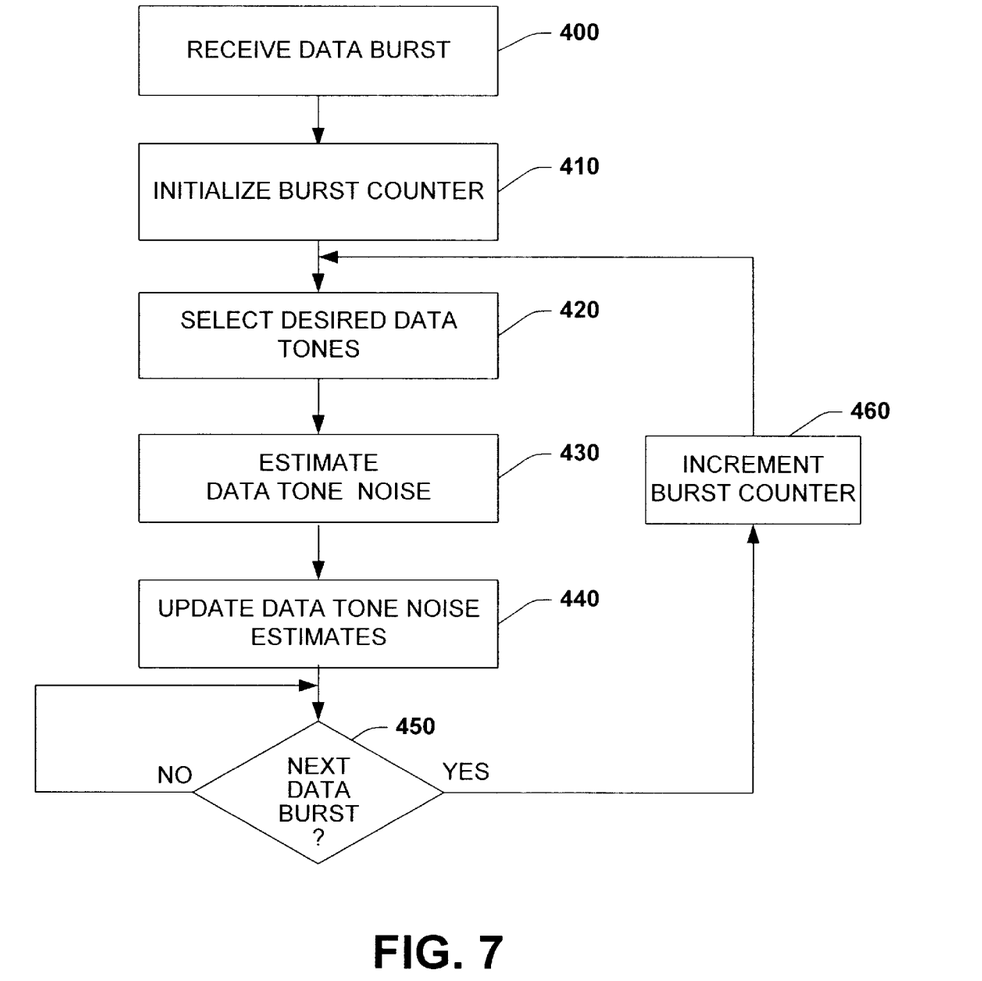
FIG. 7 is a flow diagram illustrating a methodology for estimating noise in accordance with an aspect of the present invention.
Figure 8:
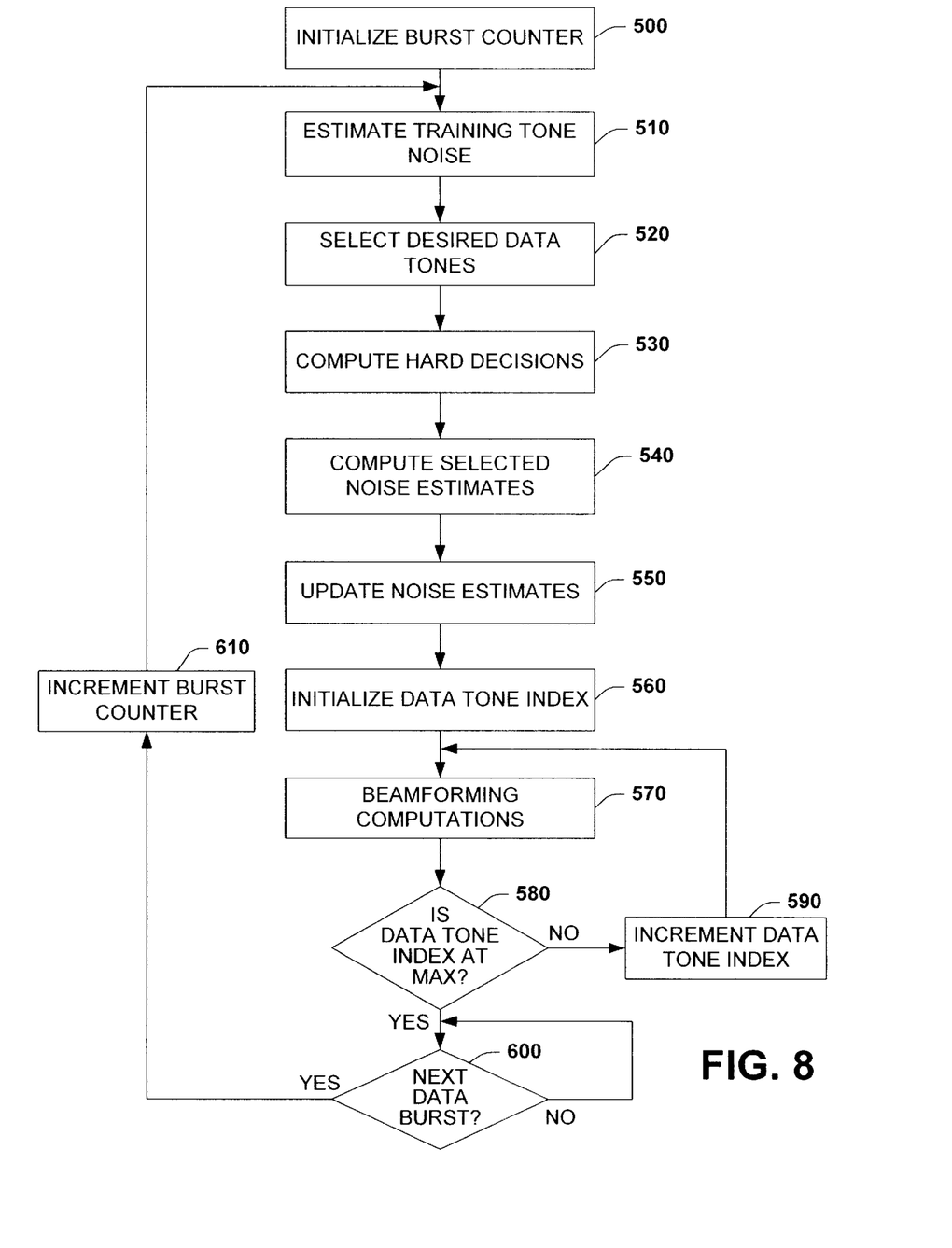
FIG. 8 is a flow diagram illustrating a methodology for beamforming in accordance with an aspect of the present invention.

In view of the foregoing structural and functional features described above, a methodology in accordance with various aspects of the present invention will be better appreciated with reference to FIGS. 7–8. While, for purposes of simplicity of explanation, the methodologies of FIGS. 7–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates an example of a methodology to perform noise estimation on a signal in accordance with an aspect of the present invention. The methodology can be implemented as hardware and/or software, such as by a DSP or an ASIC. The methodology begins at 400, in which a data signal or burst is received. Preprocessing also can be performed on the received signal, such as amplification, filtering, digitization and/or conversion of the received signal into the frequency domain. It is to be appreciated that the methodology can be implemented on both wired and wireless data signals, although, for purposes of brevity, the following describes the procedure as applied to a wireless signal.

Next, at 410, a burst counter is initialized. The burst counter provides a count value that is employed to select desired data tones on which noise estimation is performed in accordance with an aspect of the present invention. The burst counter, for example, is programmed and/or configured to count consecutively from a minimum count value (e.g., zero) to a maximum count value (e.g., g−1) and then repeat (e.g. modulo g), such that the value of g determines the decimation rate applied to the received signals. In this way, $$\frac{N_{data}}{g}$$

data tones in each data burst can be updated, thereby reducing the number of computations performed on each received signal as a function of the value of g. It is to be understood and appreciated that the value of g could be programmable and/or vary as a function of the estimated noise level so as to provide a dynamic system that can be optimized according to its environment. Additionally, the burst counter can be implemented in other forms.

From 410, the methodology proceeds to 420 in which a subset of desired data tones is selected, such as based on the present value of the burst counter. Those skilled in the art will understand and appreciate various functions or selection criteria that could be employed to select a reduced sample of desired data tones for use in noise estimation computations in accordance with an aspect of the present invention.

Next, at 430, data tone noise is estimated for the selected data tones. Data tone noise estimates, for example, are computed for the selected data tones as a function of the digitized data signals $Y_1$, $Y_2$ and the channel estimates $H_1$, $H_2$ and the computed hard decisions $Z_{hard}$ for the selected data tones (see, e.g., Eq. 5). The computed noise estimates are then employed to update corresponding noise estimates for the selected data tones at 440. By way of illustration, a register (e.g., hardware and/or software) can store noise estimates for the data tones that can be employed in subsequent processing stages. From 440, the methodology proceeds to 450.

At 450, a determination is made as to whether a next data burst has been received. The methodology can loop until the next burst is received. When a burst is received, the methodology proceeds to 460 in which the burst counter is incremented. As mentioned above, the burst counter can increment sequentially from a starting value to a maximum value and, once the maximum value is reached, it can reset to begin counting from its starting value. After the burst counter is appropriately adjusted (e.g., incremented to a next value or reset), the procedures of 420–450 are repeated for the next subset of one or more data tones selected at 420.

As a result, noise estimates will be updated for a selected subset of the data tones each iteration through the methodology for a given data burst. Because noise estimates are not required to be performed for all data tones in each data burst, computational efficiency can be increased so as to improve overall system performance. It further is to be appreciated that additional computational savings can be afforded by decreasing the number of data tones in each selected subset, although the benefits should be balanced with overall system performance.

FIG. 8 illustrates a beamforming methodology that can be implemented relative to a data signal or burst in accordance with an aspect of the present invention. The methodology begins at 500 in which a burst counter is initialized. The initialization, for example, can be coincident with receiving a data burst at one or more antennas or at a subsequent processing stage of the received signal.

Next, at 510, training tone noise is estimated for one or more data signals or bursts, such as preprocessed signals received at one or more antennas. The training tone noise estimation, for example, can be implemented based on intermediate channel estimates for the respective training tones in the current data burst relative to the intermediate channel estimates in a previous data burst. Additional scaling can be applied to noise estimate computation to compensate for slips in the data burst. A variance and correlation of the noise estimate can be computed to provide a covariance matrix. Time-based averaging also could be implemented relative to the training tone noise estimate. After training tone noise has been estimated, the methodology proceeds to 520.

At 520, desired data tones are selected. The desired data tones, for example, are selected based on the value of the burst counter, which at this time is at its initial value. A different subset of the data tones thus can be selected for each count value of the burst counter. The different subsets can include some overlapping of data tones, although for efficiency sake the subsets could include unique data tones for different count values. While this example is described with respect to selecting desired data tones based on the burst count, it is to be understood and appreciated that other bases (e.g., random tone selection, fixed functions, etc.) could be employed to select data tones in accordance with an aspect of the present invention.

From 520, the methodology proceeds to 530 in which hard decisions are computed for the selected data tones. The hard decisions, for example, can be calculated as indicated in Eq. 4, although other algorithms also could be utilized in accordance with an aspect of the present invention.

The hard decisions are employed to compute noise estimates for the selected data tones at 540. By way of example, a noise estimate can be computed for each of the selected data tones according to Eq. 5. After the initial noise estimates are computed for the selected data tones, the noise estimation (540) can include computing a variance and correlation for the selected data tones. Additionally, averaging can be performed for the computed noise estimates (or covariance thereof). Such averaging can be implemented on the selected data tones or for a different subset of data tones, as desired. The methodology then proceeds to 550.

At 550, the computed noise estimates (which can be average values) are employed to update corresponding noise estimates. The updates, for example, can be stored in a register (e.g., hardware or software) that includes noise values for all data tones. However, rather than compute noise estimates for all data tones in each data burst, as is conventional, the present invention only computes noise estimates for a desired subset of the data tones in each data burst. That is, noise estimates are computed for the subset of data tones selected at 520. Because, in accordance with an aspect of the present invention, the noise estimates are updated for a selected portion of the data tones in each data burst, it is to be appreciated that several iterations of the methodology of FIG. 8 may be required to populate the noise estimation register to enable subsequent beamforming computations. The result of decimating the noise estimate computations over a plurality of data bursts is a reduction in the overall computations for each data burst, thereby improving system performance.

Next, at 560, a data tone index is initialized to a starting value (e.g., 0). The data tone index value indicates for which data tone the beamforming computations are to be implemented. The data tone index, for example, can be employed to increment beamforming computations sequentially through each data tone. Alternatively, the data tone index can increment through data tones in a bit-reversed order.

Beamforming computations are performed (570) for the indexed data tone to provide an indication of the signal relative to noise for the indexed data tone. For example, the beamforming computations can include calculating soft decisions and NSR estimates for the indexed data tone, such as based on the updated noise estimate (e.g., as stored in the noise estimation register), channel estimate of the data burst, and frequency domain signals corresponding to the one or more received signals. By way of further illustration, the computations at 540 can be implemented according to Eqs. 8 and 9. From 570, the methodology proceeds to 580.

At 580, a determination is made as to whether the data tone index is at its maximum value, which would indicate that the beamforming computations at 570 have been implemented for all desired data tones in the present data burst. If the determination is negative, indicating that computations are required for additional data tones, the methodology proceeds to 590. At 590, the data tone index is incremented to a value to select the next data tone. The indexing at 590, for example, can be in a sequential or bit-reversed order. From 590, the methodology returns to 570 in which beamforming computations are performed for the next data tone in the present burst. If the determination at 580 is affirmative, indicating that beamforming computations have been performed for all data tones in the present burst, the methodology proceeds to 600.

At 600, a determination is made as to whether a next data burst has been received for processing. The methodology can loop at 600 until a data burst is received. When a data burst is received, which can include some preprocessing and digitizing of the received signal, the methodology proceeds from 600 to 610. At 610, the burst counter is incremented to the next value. From 610, the methodology returns to 510 in which 510–600 are implemented for the next data burst, such that data tone noise estimates are performed relative to a next selected subset of desired data tones.

The burst counter can implement a cyclic count, which resets after reaching its maximum count value. In this way, a different subset can be associated with each count value so as to provide a desired decimation of the received signal for each data burst as a function of the count value.

By way of further illustration, the burst counter can be programmed and/or configured to count from zero to g−1, where g is a natural number that defines the decimation level. The value of g further can be adjustable, such that a desired level or decimation can be provided. The burst counter thus enables noise estimates to be updated at 550 for a different selected subset of data tones based on the burst count value. As a result, the noise estimates for all data tones can be updated every g data bursts. Those skilled in the art will understand that the decimation rate, which provides a reduction in computations, should be balanced with overall system performance.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A signal processing system for use in a receiver, comprising:
    a data tone selector that identifies a subset of data tones from a received data signal having a plurality of identifiable data tones;
    a noise estimator that computes a noise estimate for each data tone in the subset of data tones; and
    a hard decision component which computes a hard decision for each data tone in the subset of data tones, the noise estimator employing the hard decision for each data tone in the subset of data tones to compute the noise estimate for each respective data tone in the subset of data tones.

2. The system of claim 1, further comprising a counter that increments a count value in response to receiving each data signal, the data tone selector identifying a subset of the plurality of data tones based on the count value.

3. The system of claim 1, the data tone selector determining a size of the subset of data tones as a function of a maximum count value for the counter and the plurality of data tones.

4. The system of claim 1, further comprising an averager operative to compute an average noise estimate for each data tone.

5. The system of claim 4, the averager being operative to compute an average noise estimate for a selected subset of the plurality of data tones, the selected subset of data tones being different from the data tones for which noise estimates were computed for a present data signal.

6. The system of claim 4, further comprising a register in which updated average noise estimates are stored, the average noise estimates for the subset of data tones being employed to update previously determined average noise estimates for corresponding data tones in the subset of data tones.

7. The system of claim 1, further comprising a register in which noise estimates are stored, the noise estimates for the subset of data tones being employed to update previously determined noise estimates for corresponding data tones in the subset of data tones.

8. The system of claim 7, further comprising a beamformer operative to perform beamforming computations for each of the plurality of data tones based on the noise estimates stored for the respective data tones.

9. The system of claim 8, the beamforming computations further comprising computing at least one of soft decisions and noise-to-signal ratio estimates for each of the plurality of data tones based on the noise estimates stored for the respective data tones.

10. The system of claim 1, further comprising a covariance function operative to compute the variance and correlation of the noise estimate for each respective data tone in the identified subset of data tones.

11. The system of claim 1, the received data signal corresponding to a multiple carrier communications technique.

12. The system of claim 1 forming part of an application specific integrated circuit.

13. The system of claim 1 being implemented as executable instructions programmed in a digital signal processor.

14. A noise estimation system comprising:
a data tone identifier operative to identify a subset of data tones from a plurality of data tones for processing with a given data burst;
a hard decision component operative to compute hard decisions for the subset of data tones in the given data burst; and
a noise estimator operative to compute a data tone noise estimate for each data tone in the desired subset of data tones based on the respective hard decisions, the noise estimator being operative to provide an indication of the computed data tone noise estimate for each data tone of the subset of data tones in the given data burst.

15. The noise estimator of claim 14, the given data burst conforming to a multiple carrier modulation format.

16. A beamforming system comprising:
an aggregator that includes stored noise estimates for a plurality of data tones, the noise estimates for a selected subset of the plurality of data tones being updated for a received data signal based on noise estimates computed for the selected subset of the plurality of data tones in the received data signal; and
a beamformer that computes at least one of a soft decision and noise-to-signal ratio estimate for each of the plurality of data tones in the received data signal based on the stored noise estimate for each respective data tone.

17. The system of claim 16, the at least one of soft decision and noise-to-signal ratio estimate for each of the plurality of data tones being computed for each of the plurality of data tones as a function of the stored noise estimate, a channel estimate and a data signal value for each respective data tone.

18. The system of claim 17, the channel estimate for each of the plurality of data tones being stored, at least one of the stored noise estimate and the stored channel estimate being updated for at least some of the plurality of data tones in the received data signal according to a respective decimation rate.

19. The system of claim 16, the beamformer computing a soft decision and noise-to-signal ratio estimate for each of the plurality of data tones in the received data signal, each of the soft decision and noise-to-signal ratio estimates being computed as a quotient having a common denominator for each data tone.

20. The system of claim 26, the denominator being computed and updated for a selected subset of the plurality of data tones of the received data signal according to a decimation rate.

21. The system of claim 19, the soft decisions ($\hat{Z}[k]$) being computed as $$\hat{Z}[k] = \frac{[H_1^*[r] \cdots H_n^*[r]][\text{adj } R_{avg}[r]]\begin{bmatrix} Y_1[r] \\ \vdots \\ Y_n[r] \end{bmatrix}}{[H_1^*[r] \cdots H_n^*[r]][\text{adj } R_{avg}[r]]\begin{bmatrix} H_1[r] \\ \vdots \\ H_n[r] \end{bmatrix}}$$

where
$H_n$ is a channel estimate for the $n^{th}$ antenna;
$R_{avg}$ is the average noise estimate;
$Y_n$ is the received data signal for the $n^{th}$ antenna;
r is a data tone index functionally related to k $\in \{0,1, \ldots, N_{data}-1\}$,
where $N_{data}$ is the number of data tones; and
n is a number of antennas at which the received data signal is received.

22. The system of claim 16 in combination with a noise estimation system, the combination comprising:
the noise estimation system comprising:
a data tone identifier operative to identify the selected subset of data tones from a plurality of data tones for processing with the received data signal;
a hard decision component which computes hard decisions for the selected subset of data tones in the received data signal; and
a noise estimator operative to compute a data tone noise estimate for each data tone in the selected subset of data tones based on the respective hard decisions, the computed data tone noise estimates being provided to update the noise estimates of the aggregator.

23. The system of claim 16, the subset of data tones being selected based on the received signal.

24. A wireless communications system, comprising:
at least one antenna operative to receive a wireless signal and convert the received signal into a corresponding electrical signal;
a preprocessing system operative to process the electronic signal and convert the electrical signal from the at least one antenna into a digital signal and perform desired preprocessing of the digital signal to provide a preprocessed digital signal in the frequency domain having a plurality of data tones and training tones for each data burst;
a decimated noise estimator operative to estimate noise for a subset of the plurality of data tones for a given data burst; and
a hard decision component which computes a hard decision for each data tone in the reduced subset of data tones for the given data burst, the noise estimator employing the hard decision for each data tone in the subset of data tones to estimate noise for each respective data tone in the reduced subset of data tones.

25. The system of claim 24, further comprising a counter that increments a count value in response to receiving a subsequent data burst, the subset of data tones being determined based on the count value for the given data burst.

26. The system of claim 25, further comprising an averager operative to compute an average noise estimate for at least some of the data tones.

27. The system of claim 24, further comprising a register in which updated noise estimates are stored, the noise estimates for the reduced subset of data tones in the given data burst being employed to update previously determined noise estimates for corresponding data tones in the reduced subset of data tones.

28. The system of claim 27, further comprising a beamformer operative to perform beamforming computations for each of the plurality of data tones in the given data burst based on the updated noise estimates for the respective data tones.

29. The system of claim 28, the beamformer computing a soft decision and noise-to-signal ratio estimate for each of the plurality of data tones in the given data burst, each of the soft decision and noise-to-signal ratio estimates being computed as a quotient having a common denominator for each data tone in the given data burst.

30. The system of claim 29, the denominator being computed and updated for a selected subset of the plurality of data tones of the given data burst according to a decimation rate.

31. The system of claim 24, further comprising a selector operative to identify the data tones in the subset of data tones for the given data burst and provide information to the noise estimator based on which the subset of the plurality of data tones are identified to the noise estimator.

32. A receiver system, comprising:
  means for receiving at least one digitized signal in the frequency domain corresponding to a data burst having a plurality of data tones;
  means for identifying a subset of the plurality of data tones from the data burst in the at least one digitized signal;
  means for estimating noise for the identified subset of the plurality of data tones;
  means for providing an indication of the data tone noise estimates for the identified subset of the plurality of data tones; and
  a count means for incrementing a count value in response to each data burst received, the means for identifying further identifying the identified subset of the plurality of data tones based on the count value.

33. The system of claim 32, further comprising means for computing a hard decision for each data tone in the identified subset of the plurality of data tones, the means for estimating employing the hard decision for each data tone in the identified subset of the plurality of data tones to estimate noise for each respective data tone in the identified subset of the plurality of data tones.

34. The system of claim 33, further comprising means for updating previously determined data tone noise estimates for corresponding data tones in the identified subset of the plurality of data tones based on the indication of data tone noise estimates for the identified subset of the plurality of data tones.

35. The system of claim 34, further comprising means for performing at least one beamforming computation for each data tone in the given data burst based on the updated noise estimates for each respective data tone.

36. A method for processing a digitized frequency domain signal having a plurality of data tones at different carrier frequencies, comprising:
  decimating a received data burst to provide a subset of a plurality of data tones associated with the received data burst;
  estimating noise for each of the data tones in the subset of data tones;
  providing an indication of the estimated noise for each data tone in the subset; and
  updating the estimated noise for the remaining data tones in the plurality of data tones by repeating the decimation and the estimation for different subsets of data tones over a plurality of data bursts.

37. The method of claim 36, further comprising performing at least one beamforming computation for each data tone in each given data burst based on the updated noise estimates for each respective data tone.

38. The method of claim 36, further comprising computing a soft decision and noise-to-signal ratio estimate for each of the plurality of data tones in the received data burst, each of the soft decision and noise-to-signal ratio estimates being computed as a quotient having a common denominator for each data tone in the received data burst.

39. The method of claim 38, further comprising computing and updating the denominator for a selected subset of the plurality of data tones of the received data burst according to a decimation rate.

40. The method of claim 36, further comprising computing a hard decision for each data tone in the identified subset of data tones, the estimation employing the computed hard decision for each data tone in the subset of data tones to estimate noise for each respective data tone in the subset of data tones.

41. A digital signal processor having computer-executable instructions for performing the method of claim 36.

42. An application specific integrated circuit configured to implement the method of claim 36.

* * * * *